United States Patent
Yamada et al.

(10) Patent No.: US 8,954,027 B2
(45) Date of Patent: Feb. 10, 2015

(54) IN-VEHICLE APPARATUS

(75) Inventors: Teruya Yamada, Chiryu (JP); Ryuta Kaneko, Okazaki (JP)

(73) Assignee: Denso Corporation, Kariya (JP)

( * ) Notice: Subject to any disclaimer, the term of this patent is extended or adjusted under 35 U.S.C. 154(b) by 803 days.

(21) Appl. No.: 13/199,626

(22) Filed: Sep. 6, 2011

(65) Prior Publication Data

US 2012/0058724 A1 Mar. 8, 2012

(30) Foreign Application Priority Data

Sep. 7, 2010 (JP) ................................ 2010-199808

(51) Int. Cl.
*H04W 76/00* (2009.01)
*H04W 4/00* (2009.01)
*H04W 76/02* (2009.01)
*H04W 4/02* (2009.01)

(52) U.S. Cl.
CPC ............ *H04W 4/008* (2013.01); *H04W 76/027* (2013.01); *H04W 4/023* (2013.01); *H04W 76/002* (2013.01)
USPC ......................................... 455/345; 455/294

(58) Field of Classification Search
CPC .................................................. H04B 1/3822
USPC .................................................. 455/345, 297
See application file for complete search history.

(56) References Cited

U.S. PATENT DOCUMENTS

| | | | | |
|---|---|---|---|---|
| 5,408,684 A | * | 4/1995 | Yunoki et al. | 455/434 |
| 2003/0129952 A1 | * | 7/2003 | Inoue | 455/95 |
| 2005/0243761 A1 | * | 11/2005 | Terry et al. | 370/328 |
| 2009/0204265 A1 | * | 8/2009 | Hackett | 700/284 |
| 2011/0014876 A1 | * | 1/2011 | Sakata et al. | 455/69 |

FOREIGN PATENT DOCUMENTS

| | | |
|---|---|---|
| JP | 6-233349 | 8/1994 |
| JP | 09-107575 | 4/1997 |
| JP | 11-039523 | 2/1999 |
| JP | 2001-345750 | 12/2001 |
| JP | 2004-328611 | 11/2004 |
| JP | 2006-5857 | 1/2006 |

(Continued)

OTHER PUBLICATIONS

ARIB STD-T88, p. 31, Section 3.2.2.4.3.4(1) "DSRC Application Sub-layer, ARIB Standard" Version 1.1, Dec. 2007, Association of Radio Industries and Business (ARIB).

ARIB STD-T75, Section 4.4.5.3.1 of "Dedicated Short Range Communication System, ARIB Standard" Version 1.5, Dec. 2008, Association of Radio Industries and Business (ARIB).

(Continued)

*Primary Examiner* — Wen Huang
(74) *Attorney, Agent, or Firm* — Harness, Dickey & Pierce, PLC

(57) ABSTRACT

An in-vehicle apparatus for performing a short range communication with a road side apparatus, which performs a hybrid communication including a broadcast communication and a point-to-point communication, is disclosed. The in-vehicle apparatus includes a communication unit and a retry count determination unit that determines whether a count of failure to establish the communication in an activation channel in the communication unit reaches a preset retry count. The in-vehicle apparatus re-selects a communication frequency when the retry count determination unit determines that the count of failure to establish the communication in the activation channel reaches the preset retry count.

5 Claims, 4 Drawing Sheets

(56) References Cited

FOREIGN PATENT DOCUMENTS

| | | |
|---|---|---|
| JP | 2009-198563 | 9/2009 |
| JP | 2009-278366 | 11/2009 |
| JP | 2010-9280 | 1/2010 |

OTHER PUBLICATIONS

Office Action mailed Sep. 4, 2012 in corresponding Japanese Application No. 2010-199808 with English translation.
Office Action issued Dec. 11, 2012 in corresponding Japanese Application No. 2010-199808 with English translation.

* cited by examiner

US 8,954,027 B2

IN-VEHICLE APPARATUS

CROSS REFERENCE TO RELATED APPLICATION

The present application is based on and claims priority to Japanese Patent Application No. 2010-199808 filed on Sep. 7, 2010, disclosure of which is incorporated herein by reference.

TECHNICAL FIELD

The present disclose relates to an in-vehicle apparatus for performing a short range communication with a road side apparatus.

BACKGROUND

What is called a broadcast communication and what is called a point-to-point communication are used as a dedicated short range communication (DSRC) between a road side apparatus serving as a base station and an in-vehicle apparatus serving as a mobile station (cf. JP-4296127B and JP-2010-9280A). The broadcast communication is a communication between a road side apparatus and multiple unspecified vehicles traveling on a road. An example of the broadcast communication is a VICS (Vehicle Information and Communication System: registered trade mark). The point-to-point communication is a communication between a road side apparatus and a specific vehicle traveling on a road. An example of the point-to-point communication is an ETC (Electronic Toll Collection System). In recent years, a hybrid communication is becoming popular. The hybrid communication is a communication in which the broadcast communication and the point-to-point communication are simultaneously preformed.

In relation to the hybrid communication, the inventors of the present application have discovered the following problem, which will be now explained below as a part of the present disclosure.

According to Non-Patent Document 1, in a case of no response from the in-vehicle apparatus to the road side apparatus's assignment of an activation channel (ACTC) within a predetermined time, an association (initialization) procedure including re-selection of a communication frequency is repeated. According to Non-Patent Document 2, in performing the broadcast communication, the in-vehicle apparatus starts a communication connection management timer (CTO) in response to receiving the broadcast communication, and then updates the CTO each time the in-vehicle apparatus receives the broadcast communication. Then, if the CTO times out after the in-vehicle apparatus departs from a communication area of the corresponding base station and becomes unable to communicate with the base station, it is determined that the vehicle departs from the communication area. According to the above standard, furthermore, in the case of the hybrid communication including the point-to-point communication and the broadcast communication, the point-to-point communication or the broadcast communication, whichever received first, is given to priority.

Non-Patent Document 1: Dedicated Short Range Communication System, ARIB Standard, ARIB STD-T75, Version 1.5, December 2008, Association of Radio Industries and Business (ARIB)

Non-Patent Document 2: DSRC Application Sub-layer, ARIB Standard, ARIB STD-T88, Version 1.1, December 2007, Association of Radio Industries and Business (ARIB)

According to the above standard, the broadcast communication is first performed and the point-to-point communication is subsequently performed in the hybrid communication. In this case, if transmission reception level between the road side apparatus and the in-vehicle apparatus is stable in a communication area (i.e., a vehicle is in a stable communication area 101, see FIG. 4), a problem does not arise in the communication. This is because the broadcast communication and the point-to-point communication are sequentially started in the hybrid communication. However, if the transmission reception level between the road side apparatus and the in-vehicle apparatus is disturbed and unstable (i.e., a vehicle is in an unstable communication area 102), the in-vehicle apparatus cannot transmit the communication to the road side apparatus although the in-vehicle apparatus can receive the communication from the road side apparatus in some cases (see FIG. 4). As illustrated in FIG. 4, because of reflection or interference of a radio wave transmitted from a road side apparatus 11, an unstable communication area 102 is formed distant from the road side apparatus 11 than a stable communication area 101 is from the road side apparatus 11. In a normal case, a vehicle 103 equipped with an in-vehicle apparatus passes through this unstable communication area 102 in a short time, and a major problem does not arise in communication establishment.

However, if the vehicle 103 stays in the unstable communication area 102 a predetermined time period or more because of, for example, traffic jam or the like, the point-to-point communication times out. This is because the point-to-point communication is not performable in the unstable communication area 102 although the broadcast communication, which is transmitted from the road side apparatus, is performable. As a result, when the vehicle 103 enters into the stable communication area 101 after passing through the unstable communication area 102, there is a possibility that the point-to-point communication has already timed out; thus, there arises a problem of being unable to perform the point-to-point communication in the hybrid communication.

SUMMARY

In view of the foregoing, it is an objective of the present disclosure to provide an in-vehicle apparatus that can reliably perform point-to-point communication in hybrid communication by using a simple configuration without requiring a change in setting etc. of a road side apparatus.

According to a first aspect of the present disclosure, an in-vehicle apparatus for performing a short range communication with a road side apparatus, which performs a hybrid communication including a broadcast communication with multiple unspecified vehicles and a point-to-point communication with a specific vehicle of the multiple unspecified vehicles, includes a communication unit, a frequency selection unit, a communication establishment determination unit, a retry count determination unit and a frequency re-selection unit. The communication unit performs communication with the road side apparatus. The frequency selection unit selects a communication frequency, which is a frequency preset for the short range communication. The communication establishment determination unit determines whether the communication in an activation channel is successfully established in the communication unit while the road side apparatus is performing the hybrid communication. The retry count determination unit determines whether a count of failure to establish the communication in the activation channel in the communication unit reaches a preset retry count. The frequency re-selection unit re-selects the communication frequency when the retry count determination unit determines that the count of failure to establish the communication in the activation channel reaches the preset retry count.

According to the above-described in-vehicle apparatus, when the count of failure to establish the communication reaches the preset retry count, the communication frequency is selected again, and a process for establishing the communication is repeated. As a result, the point-to-point communication does not time out even in the unstable communication area. Moreover, these processes are performed in the vehicle, and a change in the setting etc. of the road side apparatus is not required. Therefore, the in-vehicle apparatus can reliably perform the point-to-point communication in the hybrid communication by using a simple configuration without requiring a change in setting etc. of the road side apparatus.

According to a second aspect of the present disclosure, an in-vehicle apparatus for performing a short range communication with a road side apparatus, which performs a hybrid communication including a broadcast communication with multiple unspecified vehicles and a point-to-point communication with a specific vehicle of the multiple unspecified vehicles, includes a communication unit, a frequency selection unit, a communication establishment determination unit, a retry count determination unit and a frequency re-selection unit. The communication unit performs communication with the road side apparatus. The frequency selection unit selects a communication frequency, which is a frequency preset for the short range communication. The communication establishment determination unit determines whether the communication in the point-to-point communication is successfully established in the communication unit while the road side apparatus is performing the hybrid communication. The retry count determination unit determines whether a count of failure to establish the communication in the point-to-point communication in the communication unit reaches a preset retry count. The frequency re-selection unit re-selects the communication frequency when the retry count determination unit determines that the count of failure to establish the communication in the point-to-point communication reaches the preset retry count.

According to the above-described in-vehicle apparatus, when the count of failure to establish the point-to-point communication reaches the preset retry count, the communication frequency is selected again, and a process for establishing the communication is repeated. As a result, the point-to-point communication does not time out even in the unstable communication area. Moreover, these processes are performed in the vehicle, and a change in the setting etc. of the road side apparatus is not required. Therefore, the in-vehicle apparatus can reliably perform the point-to-point communication in the hybrid communication by using a simple configuration without requiring a change in setting etc. of the road side apparatus.

According to a third aspect of the present disclosure, an in-vehicle apparatus for performing a short range communication with a road side apparatus, which performs a hybrid communication including a broadcast communication with multiple unspecified vehicles and a point-to-point communication with a specific vehicle of the multiple unspecified vehicles, includes a communication unit, a frequency selection unit, an end signal reception unit and a frequency re-selection unit. The communication unit performs communication with the road side apparatus. The frequency selection unit selects a communication frequency, which is a frequency preset for the short range communication. While the road side apparatus is performing the hybrid communication, the end signal reception unit receives an end signal, which indicates communication termination, from the road side apparatus via the communication unit if the communication in the point-to-point communication with the communication unit has not been established within a preset period of time. The frequency re-selection unit that re-selects the communication frequency in response to reception of the end signal by the end signal reception unit.

According to the above-described in-vehicle apparatus, when the failure to establish the point-to-point communication is repeated and the end signal is received, the communication frequency is selected again, and a process for establishing the communication is repeated. As a result, the point-to-point communication does not time out even in the unstable communication area. Moreover, these processes are performed in the vehicle, and a change in the setting etc. of the road side apparatus is not required. Therefore, the in-vehicle apparatus can reliably perform the point-to-point communication in the hybrid communication by using a simple configuration without requiring a change in setting etc. of the road side apparatus.

According to a fourth aspect of the present disclosure, an in-vehicle apparatus for performing a short range communication with a road side apparatus, which performs a hybrid communication including a broadcast communication with multiple unspecified vehicles and a point-to-point communication with a specific vehicle of the multiple unspecified vehicles, includes a communication unit, a frequency selection unit, a start notification determination unit, and a frequency re-selection unit. The communication unit performs communication with the road side apparatus. The frequency selection unit selects a communication frequency, which is a frequency preset for the short range communication. The start notification determination unit determines whether, while the road side apparatus is performing the hybrid communication, the communication units has received a point-to-point start notification of the point-to-point communication within a preset time period after the communication unit received a broadcast start notification of the broadcast communication. The frequency re-selection unit re-selects the communication frequency when the start notification determination unit determines that the communication unit has not received the point-to-point start notification of the point-to-point communication within the preset period of time after the communication unit received a broadcast start notification of the broadcast communication.

According to the above-described in-vehicle apparatus, when the point-to-point start notification cannot be received within the preset time period after reception of the broadcast start notification, the communication frequency is selected again, and a process for establishing the communication is repeated. As a result, the point-to-point communication does not time out even in the unstable communication area. Moreover, these processes are performed in the vehicle, and a change in the setting etc. of the road side apparatus is not required. Therefore, the in-vehicle apparatus can reliably perform the point-to-point communication in the hybrid communication by using a simple configuration without requiring a change in setting etc. of the road side apparatus.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiment will be described below with reference to the accompanying drawings.

Figure 1:
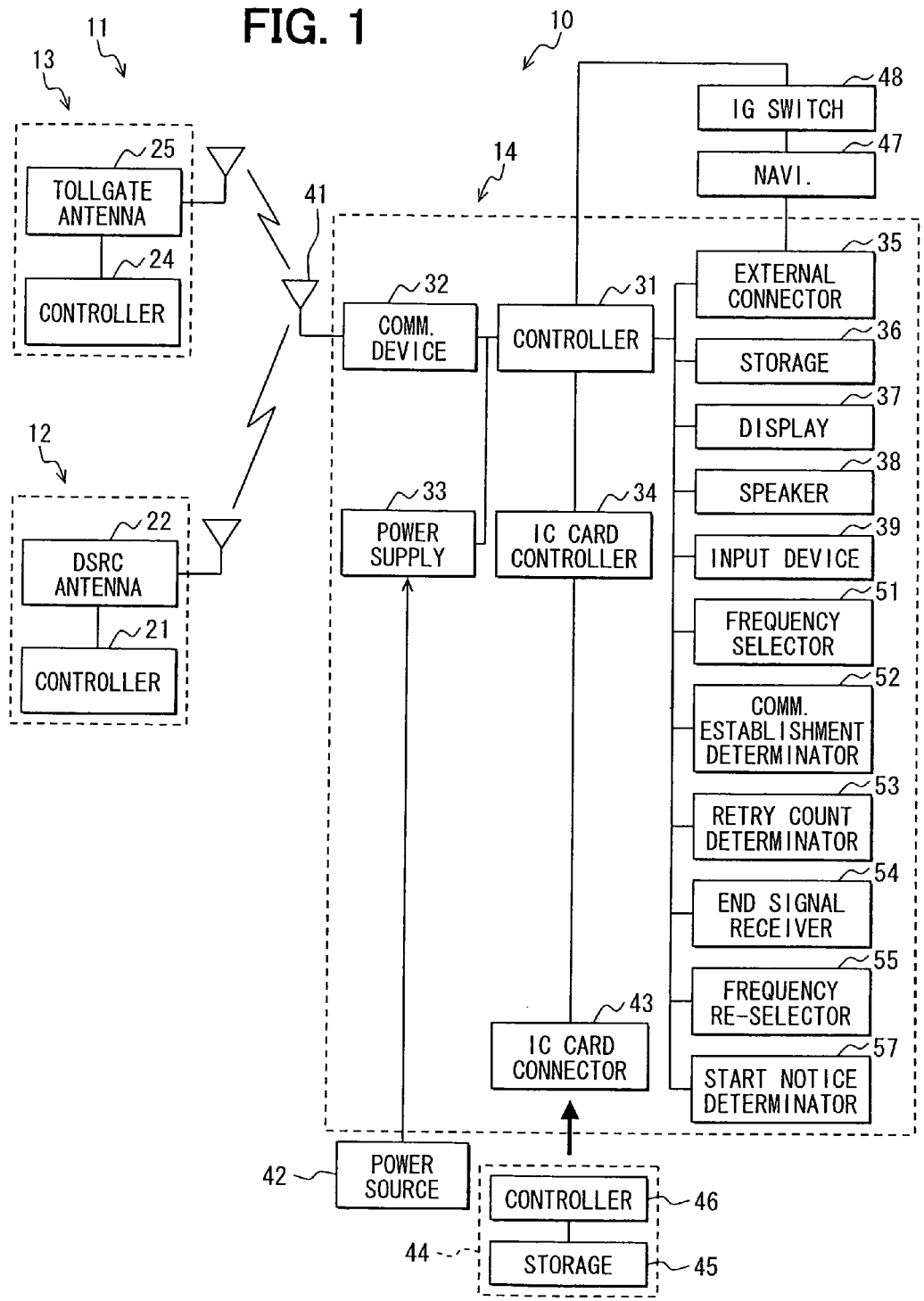
FIG. 1 is a block diagram illustrating a roadside-to-vehicle short range communication system including an in-vehicle apparatus.

An outline of a short range communication system, to which the in-vehicle apparatus of the present embodiment is applied, is shown in FIG. 1. The short range communication system 10 includes a road side apparatus 11 serving as a base station and an in-vehicle apparatus 14 serving as a mobile station. The road side apparatus 11 includes a short range communication road side device 12 and an ETC road side device 13. The short range communication road side device 12 includes a controller 21 and a short range communication antenna 22. The short range communication road side device 12 wirelessly communicates same information widely to unspecified vehicles traveling on a road, like VICS does. The controller 21 of the short range communication road side device 12 carries out the broadcast communication, so that a data provided from a data provider (not shown) is transmitted from the short range communication antenna 22. The ETC road side device 13 includes a controller 24 and a tollgate antenna 25. The ETC road side device 13 performs communication with a specific vehicle traveling on a road. The controller 24 of the ETC road side device 13 wirelessly exchanges a data with the in-vehicle apparatus, e.g., an identification data unique to each vehicle, a billing data of a road toll etc.

The in-vehicle apparatus 14 is mounted to the vehicle (not shown). The in-vehicle apparatus 14 includes a controller 31, a communication device 32 (communication unit), a power supply 33, a IC card control device 34, the external device connector 35, a storage 36, a display device 37, a speaker 38, the input operation device 39, and the like. The controller 31 includes, for example, a microcomputers with a CPU (central processing unit), a ROM (read-only memory), and RAM (random-access memory). The controller 31 controls generally all of operation of the in-vehicle apparatus 14 according to a computer program stored in the ROM. The communication device 32 includes an antenna 41 and communicates with the short range communication road side device 12 and the ETC road side device 13, which are examples of the road side apparatus 11. The power supply 33 is connected to an external power source 42 such as, for example, a battery and the like. The power supply 33 control electric power supplied to each component of the in-vehicle apparatus 14.

The IC card control device 34 includes an IC card connector 43, to which an IC card 44 serving as am external storage medium is detachably connected. The IC card control device 34 reads a data from the IC card 44 connected to the IC card connector 43 and writes a date in the IC card 44 connected to the IC card connector 43. The IC card 44 includes a storage 45 and a controller 46. The storage 45 is, for example a nonvolatile storage media, e.g., EPROM (Erasable Programmable Read Only Memory) etc. The external device connector 35 is connected with external devices mounted to the vehicle such as, for example, a navigation device 47, an ignition switch 48 and the like. The external device connector 35 exchanges a data with the navigation device 47 and the ignition switch 48. The storage 45 is provided integral with or separately from the ROM or the RAM (not shown) of the controller 31. The storage 45 stores a data used in the controller 31. The storage 45 may used together with IC card 44.

The display device 37 includes, for example, a liquid crystal display or an organic electroluminescence display. The display device 37 displays a map image used with the navigation device 47, a variety of data processed with the controller 31, and the like. The speaker 38 emits an audio guidance used with the navigation device 47, various warning sounds, and the like. The input operation device 39 includes, for example, a touch-sensitive switch integrated with the display device 37, a mechanical switch arranged in a periphery of the display device 37, and the like. The input operation device 39 receives user's instructions for operating each part of the in-vehicle apparatus 14 in addition to the navigation device 47.

The controller 31 includes a frequency selection unit 51, a communication establishment determination unit 52, a retry count determination unit 53, an end signal reception unit 54 and a frequency re-selection unit 55. The above units may be achieved by the CPU executing computer programs. That is, the above units may be achieved via software. Alternatively, the above units may achieved by dedicated circuits, i.e., achieved by hardware.

The frequency selection unit 51 selects a preset communication frequency for the short range communication with the short range communication road side device 12 and the ETC road side device 13. Specifically, the communication frequency is a frequency preset depending on the broadcast communication with the short range communication road side device 12 or the point-to-point communication with the ETC road side device 13. In this case, the communication frequency is not limited to having a single frequency. The communication frequency may be set to have multiple frequencies within a predetermined frequency range. From multiple communication frequencies, the frequency selection unit 51 selects the communication frequency (or frequencies) used for communication with the road side apparatus 11 according to a preset regulation.

The communication establishment determination unit 52 determines whether communication with the road side apparatus 11 is established while the road side apparatus 11 is performing the hybrid communication including the broadcast communication and the point-to-point communication. The communication establishment determination unit 52 determines whether communication in an activation channel between the communication device 32 and the road side apparatus 11 is established. Specifically, in the hybrid communication, the road side apparatus 11 transmits massage date channel (MDC) assignment and activation channel (ACTC) assignment to the in-vehicle apparatus 14 by frame control massage channel (FCMC). When the in-vehicle apparatus 14, which has received the above assignment, transmits ACTC back to the road side apparatus 11, the communication between the road side apparatus 11 and the in-vehicle apparatus 14 is established. The communication establishment determination unit 52 determines whether the ACTC response to the ACTC assignment in the FCMC has been successfully done.

The retry count determination unit 53 determines whether a count of failure to establish the ACTC communication, which failure is determined by the communication establishment determination unit 52, reaches a preset retry upper limit count. Specifically, each time the communication fails to be established, the retry count determination unit 53 increases count of a retry counter. In this way, the retry count determination unit 53 determines whether the count of the retry counter reaches the retry upper limit count, which is a preset value.

Moreover, the communication establishment determination unit 52 may determine whether the point-to-point communication included in the hybrid communication is established while the hybrid communication is being performed by the road side apparatus 11. Specifically, in the case of the point-to-point communication, the ETC road side device 13 of the road side apparatus 11 transmits the ACTC assignment to the in-vehicle apparatus 14 by the FCMC of the point-to-point communication. Upon receiving the ACTC assignment, the in-vehicle apparatus 14 transmits the ACTC back to the ECT road side device 13 of the road side apparatus 11; thereby, a communication between the in-vehicle apparatus 14 and the ECT road side device 13 performing the point-to-point communication is established. In this way, the communication establishment determination unit 52 determines whether or not the ACTC response to the ACTC assignment has been successfully done.

In the above, the retry count determination unit 53 determines whether a count of failure to establish the point-to-point communication, which failure is determined by the communication establishment determination unit 52, reaches a retry upper limit count. Specifically, the retry count determination unit 53 increases the count of the retry counter each time the communication in the point-to-point communication fails to be established. In this way, the retry count determination unit 53 determines whether the count value of the retry counter reaches the preset retry upper limit count.

The end signal reception unit 54 receives an end signal from the road side apparatus 11. Specifically, in some cases, the road side apparatus 11 transmits the end signal, which indicates a communication termination from the road side apparatus 11, to the in-vehicle apparatus 14. For example, although the road side apparatus 11 has been performing the hybrid communication, the point-to-point communication between the road side apparatus 11 and the in-vehicle apparatus 14 has not been established after a preset period of time. In this case, the road side apparatus 11 transmits the end signal to the in-vehicle apparatus 14, and the end signal reception unit 54 receives the end signal transmitted from the road side apparatus 11 via the communication device 32.

The frequency re-selection unit 55 re-selects the communication frequency when the retry count determination unit 53 determines that the count of failure to establish the communication in the ACTC reaches the retry upper limit count. Moreover, the frequency re-selection unit 55 re-selects the communication frequency when the retry count determination unit 53 determines that the count of failure to establish the communication in the point-to-point communication reaches the retry upper limit count. Moreover, the frequency re-selection unit 55 re-selects the communication frequency when the end signal is received with the end signal reception unit 54. For example, the frequency re-selection unit 55 newly sets multiple communication frequencies when the communication using the previously-set communication frequency (frequencies) fails to be established and the count of this failure reaches the retry upper limit count, or when the end signal is received. Then, by using the new communication frequency (frequencies) set by the frequency re-selection unit 55, the in-vehicle apparatus 14 performs the communication with the road side apparatus 11 again. It should be noted that the communication frequency newly selected by the frequency re-selection unit 55 may be identical to or different from the communication frequency that was previously selected.

Figure 2:
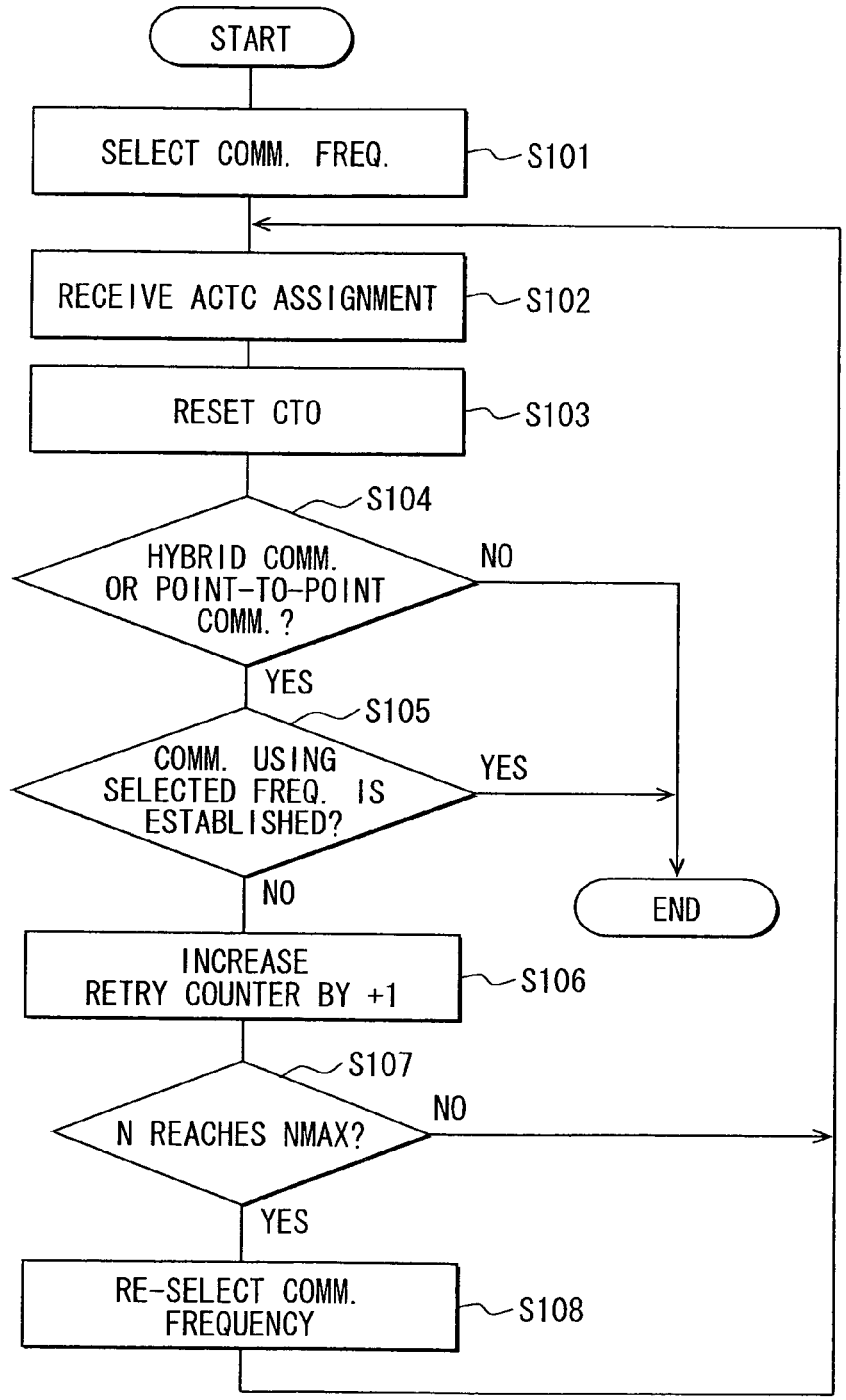
FIG. 2 is a diagram illustrating a procedure of processes of the in-vehicle apparatus.

Next, operation of the in-vehicle apparatus 14 will be described with reference to FIG. 2. FIG. 2 shows an example of a process of determining communication establishment based on whether the communication in the ACTC is established. The short range communication road side device 12 and the ETC road side device 13 of the road side apparatus 11 are performing the hybrid communication including the broadcast communication and the point-to-point communication. At S101, the frequency selection unit 51 of the in-vehicle apparatus 14 selects the communication frequency to start the communication with the road side apparatus 11. Specifically, from the multiple communication frequencies, the frequency selection unit 51 selects the communication frequency used for the communication with the road side apparatus 11 in accordance with the preset regulation. When the communication frequency is selected, the process proceeds to S102. At S102, the controller 31 of the in-vehicle apparatus 14 receives an ACTC assignment contained in the FCMC from the road side apparatus 11 including the short range communication road side device 12 and the ETC road side device 13. Specifically, the communication device 32 of the in-vehicle apparatus 14 receives a broadcast MDC assignment from the short range communication road side device 12. The communication device 32 of the in-vehicle apparatus 14 receives the ACTC assignment from the ETC road side device 13. At the same time, the controller 31 restarts the CTO, that is, resets the CTO at S103. Specifically, each time the controller 31 receives the ACTC assignment of the FCMC from the road side apparatus 11, the controller 31 resets a connection management timer (CTO). The CTO is a timer for managing connection time between the road side apparatus 11 and the in-vehicle apparatus 14. Thereby, each time the controller 31 receives the ACTC assignment of the FCMC from the road side apparatus 11, the controller 31 updates a start time of a connection time, which is to be managed between the in-vehicle apparatus 14 and the road side apparatus 11.

S104, upon resetting the CTO, the controller 31 determines whether the received ACTC assignment of the FCMC is one of the hybrid communication and the point-to-point communication. When the received ACTC assignment is not one of the hybrid communication and the point-to-point communication (S104: No), a problem of failure of the point-to-point communication caused by the time out of the point-to-point communication does not arise. Therefore, when the controller 31 determines that the received ACTC assignment is not one of the hybrid communication and the point-to-point communication (S104: No), this process is ended. When the controller 31 determines that the received ACTC assignment is one of the hybrid communication and the point-to-point communication (S104: YES), the process proceeds to S105. At S105, the communication establishment determination unit 52 determines whether the communication with the road side apparatus 11 using the communication frequency selected at S102 is established.

When it is determined that the communication using the communication frequency selected at S102 fails to be established (S105: YES), the process proceeds to S106. At S106, the retry count determination unit 53 increments the count "N" of the retry counter. At S107, the retry count determination unit 53 determines whether the count "N" of the retry counter reaches a preset retry upper limit count "Nmax". When the retry count determination unit 53 determines that the count "N" does not reach the retry upper limit count "Nmax" (S107: No), the process returns to S102, so that steps S102 to S107 are repeated until the count value "N" reaches the retry upper limit count "Nmax".

Figure 3:
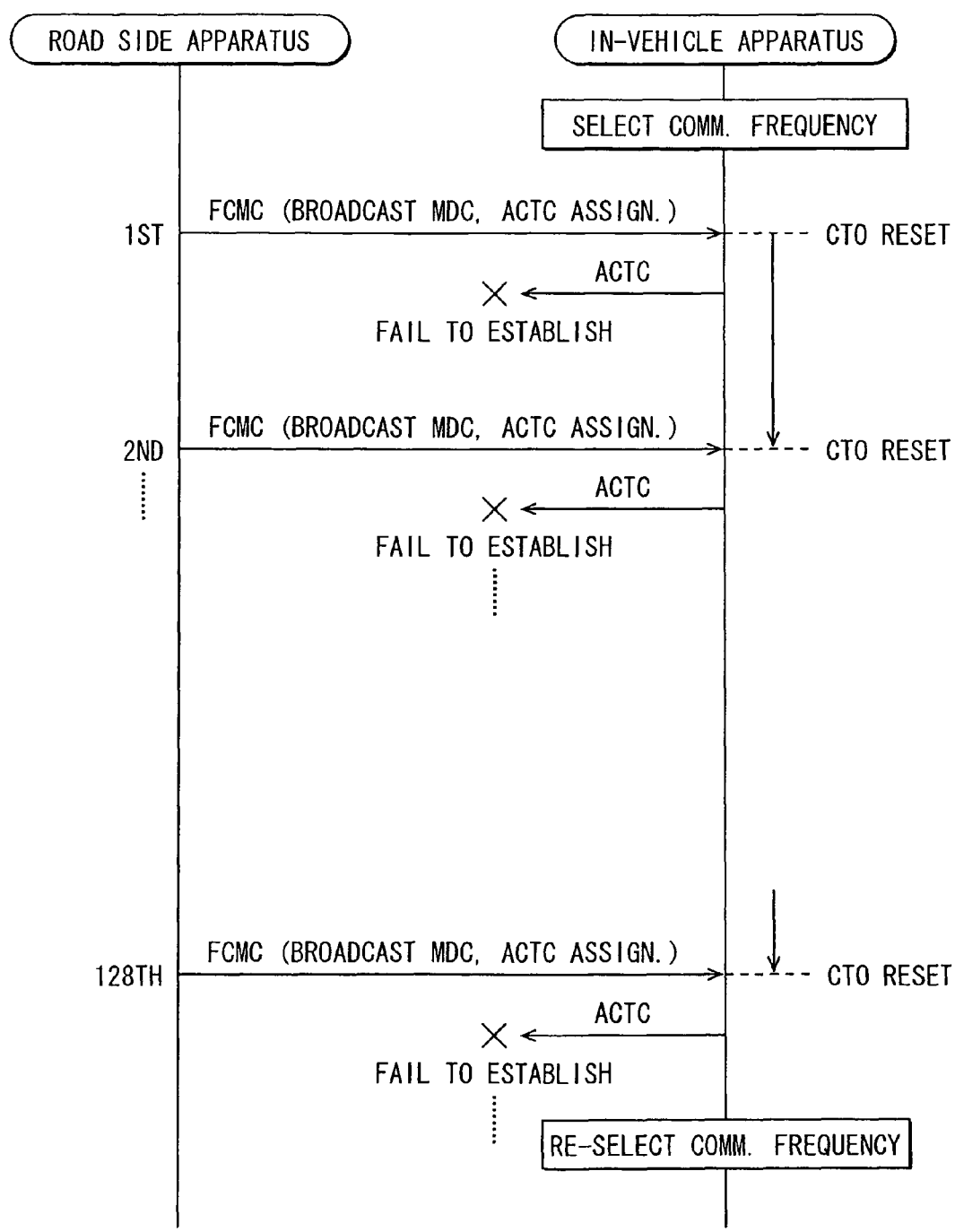
FIG. 3 is a diagram illustrating communications between the in-vehicle apparatus and a road side apparatus.

More specifically, as shown in FIG. 3, because of the FCMC of the hybrid communication, the broadcast MDC assignment and the ACTC assignment are being transmitted from the road side apparatus 11 toward the in-vehicle apparatus 14. After selecting the communication frequency, the in-vehicle apparatus 14 receives the broadcast MDC assignment and the ACTC assignment from the road side apparatus 11 because of the FCMC of the hybrid communication. Upon receiving the broadcast MDC assignment, the controller 31 of the in-vehicle apparatus 14 resets the CTO. With this, the controller 31 of the in-vehicle apparatus 14 makes an attempt to transmit the ACTC to the road side apparatus 11 via the communication device 32. Here, the communication establishment determination unit 52 of the in-vehicle apparatus 14 determines whether the ACTC has been successfully transmitted to the road side apparatus 11. When the communication establishment determination unit 52 determines that the ACTC is unsuccessfully transmitted, the retry count determination unit 53 increases the count value of the retry counter by +1, i.e., the retry count determination unit 53 increments the retry counter. Here, if the count value "N" of the retry counter does not reach the retry upper limit count "Nmax", the controller 31 repeatedly receives the broadcast MDC assignment and the ACTC assignment of the hybrid communication from the road side apparatus 11 and repeatedly transmits the ACTC.

This transmission of the ACTC in response to the reception of the ACTC assignment is repeated until the retry count determination unit 53 determines that the count "N" of the retry counter reaches the retry upper limit count "Nmax". In the present embodiment, Nmax is set to, for example, 128. In this case, until the controller 31 determines that the count value "N" of the retry counter reaches the retry upper limit count "Nmax of 128", the transmission of the ACTC in response to the reception of the ACTC assignment is repeated.

When the retry count determination unit 53 determines that the count "N" reaches the retry upper limit count "Nmax" (S107: Yes), the proceeds to S108. At S108, the communication frequency, which was selected by the frequency selection unit 51, is reselected by the frequency re-selection unit 55. In other words, the frequency re-selection unit 55 re-selects the communication frequency since the communication using the communication frequency selected at S101 has failed to be established. The communication frequency newly selected by the frequency re-selection unit 55 may be identical to or different from the communication frequency that was previously selected at S101. After the frequency re-selection unit 55 re-selects the communication frequency, the process returns to S102. In this way, the controller 31 repeats S102 and subsequent steps until the communication is established at S105.

When the controller 31 determines that the communication is established (S105: Yes), the controller 31 ends the process illustrated in FIG. 2 and proceeds an actual communication using the hybrid communication. In the above-described embodiment, the communication establishment determination unit 52 determines whether the communication in the ACTC is established. The retry count determination unit 53 determines whether a count "N" of failure to establish the communication in the ACTC, which failure is determined by the communication establishment determination unit 52, reaches a preset retry upper limit count "Nmax". When the retry count determination unit 53 determines that the count of retry, i.e., the count "N" of failure to establish the communication, reaches the retry upper limit count "Nmax", the frequency re-selection unit 55 selects the communication frequency again. In this way, when the count "N" of unsuccessful establishment of the communication reaches the retry upper limit count "Nmax", the communication frequency is selected again, and the process for establishing the communication is repeated. As a result, even in the unstable communication area 102 (see FIG. 4), until the point-to-point communication is established, the time out can be prevented. It should be noted that the above process is preformed in the vehicle, and does not require a change in the setting and the update of hardware etc. of the road side apparatus 11. Therefore, without requiring a change of the road side apparatus 11, the in-vehicle apparatus 14 can reliably perform the point-to-point communication in the hybrid communication while employing a simple configuration.

In one embodiment, in place of the determination of whether the count "N" of the retry counter for the ACTC reaches the retry upper limit count "Nmax", the controller 31 may make a determination of whether the communication in the point-to-point communication included in the hybrid communication is established. This determination of whether the communication in the point-to-point communication is established is made by the communication establishment determination unit 52 and the retry count determination unit 53. In this case, if a count "N" of failure to establish the communication in the point-to-point communication reaches a retry count upper limit "Nmax", the communication frequency is selected again, and the process for establishing the communication is repeated. As a result, even in the unstable communication area 102, until the point-to-point communication is established, the time out can be prevented. It should be noted that the above process is preformed in the vehicle, and does not require a change in the setting and the update of hardware etc. of the road side apparatus 11. Therefore, without requiring a change of the road side apparatus 11, the in-vehicle apparatus 14 can reliably perform the point-to-point communication in the hybrid communication while employing a simple configuration.

In the above embodiment, the retry count determination unit 53 determines whether the count "N" of unsuccessful establishment of the communication reaches the retry upper limit count "Nmax". Alternatively, the in-vehicle apparatus 14 may be configured such that the frequency re-selection unit 55 re-selects the communication frequency when the end signal reception unit 54 receives the end signal from the road side apparatus 11. In this configuration, when the point-to-point communication between the road side apparatus 11 and the in-vehicle apparatus 14 has been not established after the preset period of time and the end signal is transmitted from the road side apparatus 11, the end signal reception unit 54 of the in-vehicle apparatus 14 receives the end signal. When the end signal reception unit 54 receives the end signal, the frequency re-selection unit 55 selects the communication frequency again. In this way, the frequency re-selection unit 55 re-selects the communication frequency, and the process for establishing the communication is repeated. As a result, in the unstable communication area 102, until the point-to-point communication is established, the time out can be prevented. It should be noted that the above process is preformed in the vehicle, and does not require a change in the setting and the update of hardware etc. of the road side apparatus 11. Therefore, without requiring a change of the road side apparatus 11, the in-vehicle apparatus 14 can reliably perform the point-to-point communication in the hybrid communication while employing a simple configuration. As a result, in the unstable communication area 102, until the point-to-point communication is established, the time out can be prevented. It should be noted that the above process is preformed in the vehicle, and does not require a change in the setting and the update of hardware etc. of the road side apparatus 11. Therefore, without requiring a change of the road side apparatus 11, the in-vehicle apparatus 14 can reliably perform the point-to-point communication in the hybrid communication while employing a simple configuration.

Embodiment is not limited to the above embodiment but can have various forms, examples of which will be described below.

The communication frequency may be re-selected based on a time period between a broadcast start notification and a point-to-point start notification in place of based on the determination as to the count of retry and the reception of the end signal. The broadcast start notification is a notification of a start of the broadcast communication by the road side apparatus 11. The point-to-point start notification is a notification of a start of the point-to-point communication by the road side apparatus 11. Specifically, the in-vehicle apparatus 14 is provided with a start notification determination unit 57. The start notification determination unit 57 is achieved by the controller 31 performing a computer program stored in, for example, the ROM. That is, the start notification determination unit may be achieved via software. Alternatively, the start notification determination unit 57 may achieved by hardware, e.g., a dedicated circuit. When the communication device 32 receives the broadcast start notification, i.e., a broadcast MDC included in the FCMC, from the road side apparatus 11 while the road side apparatus 11 is performing the hybrid communication, the start notification determination unit 57 starts a communication measurement timer. Then, the start notification determination unit 57 determines whether the point-to-point start notification, e.g., MDC DW assignment etc., is received until count of the communication measurement timer reaches a preset time period. When the start notification determination unit 57 determines that the point-to-point start notification has not received within the preset time period after reception of the broadcast start notification, the notification re-selection unit 51 re-selects the communication frequency. As a result, in the unstable communication area, until the point-to-point communication is established, the time out can be prevented. It should be noted that the above process is preformed in the vehicle, and does not require a change in the setting and the update of hardware etc. of the road side apparatus 11. Therefore, without requiring a change of the road side apparatus 11, the in-vehicle apparatus 14 can reliably perform the point-to-point communication in the hybrid communication while employing a simple configuration.

According to an example of the above embodiment, it is possible to address the below-described problem and it is possible to achieve the below-described advantage.

Figure 4:
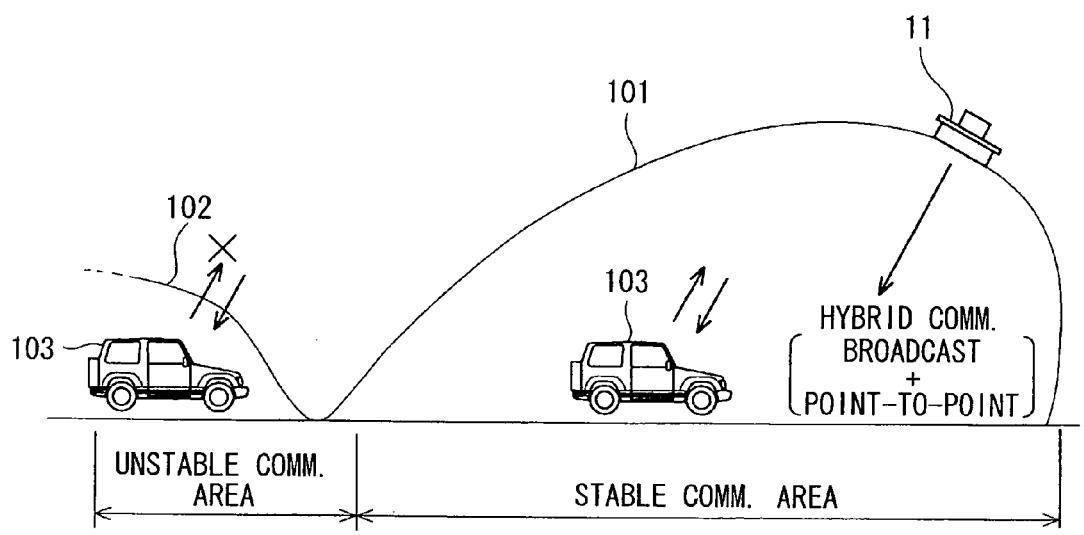
FIG. 4 is a diagram illustrating a communication area formed by a road side apparatus.

In typical, it may be preferable that the hybrid communication, which is a hybrid of the broadcast communication and the point-to-point communication, should be performed in the stable communication area 101 where a signal transmission and reception between the in-vehicle apparatus 14 and the road side apparatus 11 is possible (see FIG. 4). However, depending on situations, the unstable communication area 102 is formed. The unstable communication area 102 is an area where the in-vehicle apparatus 14 cannot receive a signal from the road side apparatus 11 although the road side apparatus 11 can receive a signal from the in-vehicle apparatus 14 (see FIG. 4). In this unstable communication area 102, the point-to-point communication may time out, and only the broadcast communication is established. If the point-to-point communication times out, the point-to-point communication cannot be restarted until a signal reception level of the broadcast communication decreases and the broadcast communication ends.

However, according to the above embodiment, as described above, when the point-to-point communication times out (fails to be established), the in-vehicle apparatus 14 re-selects the communication frequency to attempt to restart the point-to-point communication. Therefore, it is possible to restart the point-to-point communication before the signal reception level of the broadcast communication decreases and the broadcast communication ends. Therefore, by using a simple configuration, the in-vehicle apparatus 14 of the above embodiment can reliably perform the point-to-point communication in the hybrid communication. In particular, the in-vehicle apparatus 14 of the above embodiment can reliably perform the point-to-point communication even when the unstable communication area 102 is formed distant from the road side apparatus 11 than the stable communication area 101 is (see FIG. 4).

In view of the above, according to another example of the embodiment, the in-vehicle apparatus 14 may re-select the communication frequency when the in-vehicle apparatus 14 detects a time out of the point-to-point communication while the road side apparatus 11 is performing the hybrid communication. For example, the in-vehicle apparatus 14 may include a frequency selection unit 51 that selects a communication frequency for the short range communication; a time out detection unit 53, 54, 56 that detects a time out of the point-to-point communication while the road side apparatus 11 is performing the hybrid communication; and a frequency re-selection unit 55 that re-selects the communication frequency when the time out detection unit 53, 54, 56 detects the time out of the point-to-point communication. The above time out detection unit 53, 54, 56 may include the retry count determination unit detect 53 and may detect a retry time out of the ACTC. In this case, when the time out detection unit 53, 54, 56 detects the retry time out of the ACTC, the frequency re-selection unit 55 re-selects the communication frequency. Alternatively, the above time out detection unit 53, 54, 56 may detect a retry time out of the point-to-point communication. In this case, when the time out detection unit 53, 54, 56 detects the retry time out of the point-to-point communication, the frequency re-selection unit 55 re-selects the communication frequency. Alternatively, the above time out detection unit 53, 54, 56 may include the end signal reception unit 54, and may receive a time out signal (i.e., the above-described end signal), which indicates a time out of the point-to-point communication and is transmitted from the road side apparatus 11 when the road side apparatus 11 detects the time out of the point-to-point communication.

While the invention has been described above with reference to various embodiments thereof, it is to be understood that the invention is not limited to the above described embodiments and constructions. The invention is intended to cover various modifications and equivalent arrangements.

What is claimed is:

1. An in-vehicle apparatus for performing a short range communication with a road side apparatus that performs a hybrid communication including a broadcast communication with multiple unspecified vehicles and a point-to-point communication with a specific vehicle of the multiple unspecified vehicles, the in-vehicle apparatus comprising:

a communication unit that performs communication with the road side apparatus;

a frequency selection unit that selects a communication frequency, which is a preset frequency for the short range communication;

a start notification determination unit that determines whether, during the hybrid communication, the communication units has received a point-to-point start notification of the point-to-point communication within a preset time period after the communication unit received a broadcast start notification of the broadcast communication; and a frequency re-selection unit that re-selects the communication frequency when the start notification determination unit determines that the communication unit has not received the point-to-point start notification of the point-to-point communication within the preset period of time after the communication unit received the broadcast start notification of the broadcast communication.

2. The in-vehicle apparatus according to claim 1, wherein the communication unit performing communication with the road side apparatus a second time using the frequency preset for the short range communication.

3. The in-vehicle apparatus according to claim 1, wherein the frequency re-selection unit always re-selects the communication frequency when the start notification determination unit determines that the communication unit has not received the point-to-point start notification within the preset period of time.

4. The in-vehicle apparatus according to claim 1, wherein the frequency re-selection unit re-selects the preset frequency for the communication frequency.

5. An in-vehicle apparatus performing a short range communication with a road side apparatus, the road side apparatus performing a hybrid communication including a broadcast communication with multiple unspecified vehicles and a point-to-point communication with a specific vehicle of the multiple unspecified vehicles, the in-vehicle apparatus comprising:

a frequency selection unit selecting a communication frequency, the communication frequency being a preset frequency for the short range communication;

a communication unit communicating with the road side apparatus a first time using the preset frequency, the communication unit receiving the broadcast communication using the preset frequency;

a start notification determination unit that determines whether, during the hybrid communication, the communication units has received a point-to-point start notification of the point-to-point communication within a preset time period after the communication unit received a broadcast start notification of the broadcast communication; and a frequency re-selection unit that re-selects the preset frequency when the start notification determination unit determines that the communication unit has not received the point-to-point start notification of the point-to-point communication within the preset period of time after the communication unit received the broadcast start notification of the broadcast communication; wherein the communication unit communicating with the road side apparatus a second time using the preset frequency, the communication unit again receiving the broadcast communication using the preset frequency.

* * * * *